United States Patent
Böhm et al.

(10) Patent No.: US 6,808,587 B2
(45) Date of Patent: Oct. 26, 2004

(54) SELF-ADHESIVE PROTECTIVE ARTICLE FOR PAINTED AUTOMOBILE PARTS SUBJECT TO HIGH MECHANICAL STRESS

(75) Inventors: Nicolai Böhm, Hamburg (DE); Ulrike Wappler, Hamburg (DE); Jobst-Waldemar Klemp, Schenefeld (DE); Ingolf Schütz, Hamburg (DE)

(73) Assignee: tesa AG, Hamburg (DE)

( * ) Notice: Subject to any disclaimer, the term of this patent is extended or adjusted under 35 U.S.C. 154(b) by 23 days.

(21) Appl. No.: 10/077,659

(22) Filed: Feb. 15, 2002

(65) Prior Publication Data

US 2003/0008137 A1 Jan. 9, 2003

(30) Foreign Application Priority Data

Jun. 6, 2001 (DE) .......................................... 101 27 325

(51) Int. Cl.⁷ ................................................. C09J 5/00
(52) U.S. Cl. ............................ 156/306.3; 428/355 BL; 428/344; 428/343; 428/354; 428/219; 428/213; 428/137; 428/138; 428/304.4; 442/315; 442/304; 442/151; 442/149
(58) Field of Search ......................... 428/355 BL, 344, 428/343, 354, 219, 213, 137, 138, 304.4; 442/315, 304, 151, 149; 156/306.3

(56) References Cited

U.S. PATENT DOCUMENTS 5,547,766 A * 8/1996 Gobran ........................ 428/515
5,895,714 A 4/1999 Malek ........................ 428/337
6,083,613 A * 7/2000 Hayashi et al. .......... 428/315.7
6,358,600 B1 * 3/2002 Hayashi et al. .......... 428/317.3
6,395,390 B1 * 5/2002 Inoue et al. ................. 428/343
6,436,531 B1 * 8/2002 Kollaja et al. .......... 428/355 R
2002/0197925 A1 * 12/2002 Hamulski ................... 442/286
2003/0008137 A1 * 1/2003 Bohm et al. ................. 428/343

FOREIGN PATENT DOCUMENTS

| DE | 195 32 220 A1 | 3/1997 | ............. C09J/7/02 |
| DE | 197 16 712 A1 | 10/1998 | .......... B65D/65/38 |
| EP | 0 768 354 A2 | 4/1997 | ............. C09J/7/02 |
| EP | 0 827 526 B1 | 8/1999 | .......... C09J/123/18 |
| EP | 0 959 119 A3 | 11/1999 | ............. C09J/7/02 |
| EP | 0 959 119 A2 | 11/1999 | ............. C09J/7/02 |
| EP | 0 992 558 A2 | 4/2000 | ............. C09J/7/04 |
| EP | 0 959 119 B1 | 8/2003 | ............. C09J/7/02 |
| WO | WO 96/37568 | 11/1996 | .......... C09J/123/18 |
| WO | WO 98/47977 | 10/1998 | ............. C09J/7/04 |

* cited by examiner

Primary Examiner—William P. Watkins, III
(74) Attorney, Agent, or Firm—Norris McLaughlin & Marcus PA

(57) ABSTRACT

A self-adhesive article for mechanical protection of painted plastic mounted parts of automobiles, comprising a backing material in film form whose outer side is laminated with a layer of knitted fabric and whose inner side is pressure-sensitively adhesive through application of a self-adhesive composition.

19 Claims, No Drawings

SELF-ADHESIVE PROTECTIVE ARTICLE FOR PAINTED AUTOMOBILE PARTS SUBJECT TO HIGH MECHANICAL STRESS

The invention relates to a self-adhesive article for the in-transit protection of painted automobile parts such as, in particular, bumpers, which are subject to high mechanical stress.

The painting of plastic automobile parts such as bumpers or mirror housings the same color as the car is nowadays standard in the contemporary visual design of modern motor vehicles. Consequently, these parts are very sensitive to scratching. The bumpers and mirrors in particular are exposed auto parts which can very easily be grazed. The response of automakers to the increased level of quality awareness among customers must therefore be to provide these parts with effective protection as they travel through the operations of painting via assembly in the car plant through to delivery to the customer, in order to prevent complaints from the outset.

In recent years, therefore, attempts have been made to transfer the method successfully employed for freshly painted sheet metal parts, namely that of masking the parts with special, paint-compatible transit protection films, as described for example in DE 195 32 220 A1 or in EP 0 827 526 A1, to bumpers.

This was found difficult with bumpers on account of the fact that in the course of maneuvering the automobiles, said films were no match for the frequent severe stresses occurring as a result of scrapes along the bumper and minor collisions, and did not give an adequate protective effect. Moreover, on the highly curved bonding geometries of the bumpers and mirror housings, the relatively rigid films can be adhered only with a great deal of creasing, leading in many cases, and particularly when promoted by any gradual outgassing of solvents from the bumper plastic, to irreversible impressions of the creasing on the sensitive paint.

An improved protective effect against impact loads is possessed, however, by foam cushions bonded adhesively to the bumpers. On scraping collision, against concrete pillars, for example, the mechanical resistance offered by foams is low, however.

The main problem, though, is with secure adhesive bonding. Experience has shown that in many cases simply in rain the cushions fall off, and so firstly no longer provide any protective effect and secondly contaminate the environment. More securely bonding adhesives generally prove to be incompatible with the paint, with the inevitable consequence of deformations.

DE 197 16 712 A1 discloses for bumper protection a masking material based on woven fabric which is provided with a self-adhesive polyisobutylene composition. Although such a tape has a good mechanical protective effect, an open weave offers no protection against harmful chemical effects as exerted by service fluids such as gasoline, battery acid or brake fluid. Additionally, such a fabric may become full of water and, over a period of time, can cause incipient swelling of the sensitive paint. The most serious effect, however, is that of the fabric structure, which is transferred to the thin film of adhesive and, in the case of particularly fresh and sensitive paints, can result in irreversible impressions of the fabric pattern.

EP 0 959 119 A1 describes a self-adhesive protective article which is composed of a film/nonwoven laminate. An article of this kind does offer a good protective effect against frictional loads and an effective seal against liquid contaminants. Nonwovens as specified therein, however, are generally not very stretchy, and so a laminate stressed in this way can be applied only with severe creasing and, as a result, is highly incompatible with the paint.

It is an object of the invention to provide a transit protection article for bumpers and other painted plastic mounted parts for automobiles which does not exhibit the disadvantages of the prior art, or not to the same extent. In particular, the article ought first to be highly conforming to curved surfaces and secondly to be impervious to water and automotive service media (such as gasoline, diesel, brake fluid) while possessing a high degree of abrasion resistance, and therefore combining outstanding mechanical protection with excellent paint compatibility on the particularly sensitive paint on such parts.

This object is achieved by means of a self-adhesive article as specified in the main claim. The subclaims relate to advantageous developments of the protective article and to particular application options.

The invention accordingly provides a paint-compatible self-adhesive article for mechanical protection of painted plastic mounted parts of automobiles, comprising a backing material in film form whose outer side is laminated with a layer of knitted fabric and whose inner side is pressure-sensitively adhesive as a result of application of a self-adhesive composition.

In one preferred embodiment, the protective article is composed of a UV-stabilized unoriented polyolefin film backing material, said film having a Young's modulus of less than 300 $N/mm^2$, preferably less than 150 $N/mm^2$, and a thickness of from 10 to 150 $\mu$m, preferably from 40 to 100 $\mu$m.

The top of the film of the invention is laminated with a knitted fabric which advantageously has a basis weight of from 10 to 200 $g/m^2$, preferably from 20 to 80 $g/m^2$.

With further preference, the underside of the film is coated with from 10 to 80 $g/m^2$, preferably from 15 to 40 $g/m^2$, of a self-adhesive composition.

Suitable materials for the backing film are, in principle, all polymeric substances from which it is possible to produce films having a low Young's modulus, such as polyolefins, polyurethanes or plasticized PVC.

It is possible with preference to use low density polyolefins with which the inventive Young's modulus range can be obtained. Suitable for this purpose are a wide variety of copolymers of ethylene with $\alpha$-olefins such as, typically, propylene, 1-butene, 1-hexene or 1-octene (predominantly LLDPE, VLDPE, ULDPE), but also ethylene-styrene copolymers and copolymers of propylene with ethylene and $\alpha$-olefins, thus including EPDM and EPM rubbers. Likewise highly suitable are saturated synthetic rubbers such as polyethylene-vinyl acetate (EVM), hydrogenated nitrile rubbers, and synthetic styrenic rubbers such as SEBS and SEPS, since unlike the unsaturated variants, including natural rubber, these have a good weathering stability. It is also possible for halogenated polymers such as chlorinated polyethylene or chloroprene to find application.

Preference is given to using mixtures of different suitable polyolefins in order to allow optimum setting of the mechanical and thermal properties and also qualities such as processability, anchoring of the adhesive, etc.

In order to increase further the softness of a suitable material and the impact damping effects, the film may also be foamed.

In order to give the backing film the requisite weathering stability, the addition of light stabilizers is preferred. Their function lies primarily in preventing the embrittlement of the backing film.

Light stabilizers of this kind are described in Gaechter und Müller, Taschenbuch der Kunststoff-Additive, Munich 1979, in Kirk-Othmer (3rd) 23, 615–627, in Encycl. Polym. Sci. Technol. 14, 125–148, and in Ullmann (4th) 8, 21; 15, 529, 676. HALS stabilizers in particular are suitable for the protective film of the invention.

The amount of light stabilizer should be at least 0.15% by weight, preferably at least 0.30% by weight, based on the backing film.

An additional improvement in the light stability of the backing film is also possible through the addition of titanium dioxide. Advantageous in respect of the mechanical properties and the homogeneity of the whiteness are additions of from 5 to 15% by weight of titanium dioxide. As a result of the interaction of light stabilizers and pigments, the UV transmittance of the protective film in the region from 290 to 360 nm is preferably below about 1%, more preferably below about 0.1%.

For optical reasons, the film may also be color pigmented.

In the case of painted plastic parts having a high residual paint solvent content, as a result for instance of low drying temperatures, it can be advantageous to perforate the base film in order to provide better gas permeability.

For reasons of improved processability, especially in connection with the film blowing technique, it can be advantageous to add antiblocking agents, such as chalk or talc. Such a film can also, however, be produced by flat film extrusion or by calendering. The film itself, therefore, can be composed of two or more individual layers.

Knitted fabrics are produced from one or more threads or thread systems by intermeshing (interlooping), in contrast to woven fabrics, which are produced by intersecting two thread systems (warp and weft threads), and nonwovens (bonded fiber fabrics), where a loose fiber web is consolidated by heat, needling or stitching or by means of water jets.

Knitted fabrics can be divided into weft knits, in which the threads run in transverse direction through the textile, and warp knits, where the threads run lengthwise through the textile. As a result of their mesh structure, knitted fabrics are fundamentally pliant, conforming textiles, since the meshes are able to stretch lengthways and widthways, and have a tendency to return to their original position. In high-grade material, they are very robust.

The knit may be any such fabric, preferably having a basis weight of from 10 to 200 g/m$^2$, with particular preference from 20 to 80 g/m$^2$, in order to ensure good flexibility even when combined with the basefilm. The most suitable types are those which are particularly resistant to abrasion and to impact in combination with the elastic basefilm.

Examples of suitable fiber raw materials are synthetic fibers made of addition polymers such as polyethylene, polypropylene and blends thereof, polyvinyl chloride, polyvinylidene dichloride or polyacrylonitrile, polycondensates such as polyamide, including aramid, or polyesters. It is likewise possible to use semisynthetic fibers such as filament or staple viscose, or natural fibers such as cotton, wool or silk, and also fiber blends.

It is preferred to use the outstandingly moisture-resistant, synthetic, thermoplastic fibers polyamide, polyester or polyethylene. These fibers generally withstand six-month outdoor weathering periods adequately, but if needed can be additionally UV stabilized, either by incorporating the stabilizer into the fiber or by treating the knitted fabric with a photoprotective impregnation. Suitable light stabilizers are listed in the same source as cited in relation to the stabilizing of the film.

The knitted fabric can be joined to the backing film using solvent-free laminating adhesives, especially reactive laminating adhesives, such as aromatic or, preferably, aliphatic polyurethane adhesives. Likewise suitable are all common hotmelt, dispersion or solvent-based adhesives, provided they have the required weathering stability, examples being polyacrylates, polyethylene-vinyl acetate, or epoxy-curing systems. The laminating adhesive may be applied over the complete area or partially, particularly in dots or stripes.

Depending on material, the film can also be joined to the knitted fabric without adhesives, by hot lamination. In the case of the flat film extrusion of low-density polyolefins, the film can also be extruded onto the knitted fabric and so joined by melting.

As the polymer basis for adhesives it is possible to use elastomers such as, for example, EPDM rubber or EPM rubber, polyisobutylene, butyl rubber, EVM (ethylene-vinyl acetate copolymer), hydrogenated block copolymers of dienes (by hydrogenation, for example, of SBR, cSBR, BAN, NBR, SBS, SIS or IR; such polymers are known, for example, as SEPS and SEBS) or acrylic copolymers. Since the protective films of the invention are to be stable to aging and weathering, it is possible to use unstable unsaturated elastomers such as natural rubber, SIS, SBS, SBR or NBR, but these appear to be less suitable.

It can be advantageous to crosslink the adhesive in order to enhance its shear strength and so to prevent residues of adhesive caused by shrinking. For crosslinking, the customary crosslinking agents are suitable. Preference is given to the technique of radiation crosslinking, particularly with UV radiation and electron beams. In order to optimize the properties, especially the adhesion for specific paints, the self-adhesive composition employed can be blended with one or more additives such as tackifiers (resins), plasticizers, fillers, pigments, UV absorbers, light stabilizers, aging inhibitors, crosslinking agents or crosslinking promoters.

Tackifiers for increasing the adhesion properties of the adhesives are, for example, hydrocarbon resins (made, for example, from unsaturated $C_5$ or $C_7$ monomers), terpene-phenolic resins, terpene resins made from raw materials such as α- or β-pinene, aromatic resins such as coumarone-indene resins, or resins of styrene or α-methylstyrene, such as rosin and its derived products such as disproportionated, dimerized or esterified resins, in which context it is possible to use glycols, glycerol or pentaerythritol, and also others, as set out in Ullmann's Enzyklopädie der technischen Chemie, volume 12, pages 525 to 555 (4th edition), Weinheim. Particularly suitable are aging-stable resins without an olefinic double bond, such as hydrogenated resins, for example.

Examples of suitable fillers and pigments are carbon black, titanium dioxide, calcium carbonate, zinc carbonate, zinc oxide, silicates or silica.

Suitable UV absorbers, light stabilizers and aging inhibitors for the adhesives are the same as those suitable for stabilizing the film.

Examples of plasticizers, whose use is optional, include aliphatic, cycloaliphatic, and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylates, polyvinyl ethers, liquid resins and soft resins based on the raw materials for tackifier resins, lanolin and other waxes, or liquid silicones.

In general, the adhesives can be coated from solution, in which case the properties of the adhesive develop after the solvent is evaporated. In some cases the adhesive can also be applied from the melt, as in the case in particular of the styrene block copolymers and polyethylene-vinyl acetate.

In order to improve the adhesion between film and adhesive it is advantageous to apply an adhesion promoter layer. This layer is composed, preferably, of components of the base layer and/or adhesive. With particular preference the adhesion promoter comprises at least one polymer containing at least one α-olefin and a polar comonomer. Examples thereof are ionomers, ethylene-vinyl acetate copolymers, ethylene-(meth)acrylic acid copolymers or maleic anhydride-modified polyolefins.

Alternatively, the adhesion between film and adhesive is effectively improved by means of physical pretreatment of the film, such as corona discharge or flame pretreatment.

Thus configured, a protective article of the invention can be applied with little creasing, and hence with paint compatibility, to the generally curved surfaces of mounted plastic automobile parts. The combination of flexible knitted fabric and film having a low Young's modulus produces excellent resistance to frictional loads and minor impacts, exceeding that of a woven fabric of analogous basis weight, and exhibits a high level of sealing with respect to liquids and their paint-detrimental effect.

The protective article can be removed without residue or delamination even after a typical outdoor weathering application period of six months. After that time, the painted plastic element to be protected has not suffered any lasting changes, such as discoloration or irreversible paint deformation.

From painting through to the delivery of the finished vehicle to the customer, the protective article gives an excellent protective effect against scratches and inadvertent scraping against obstacles.

In the text below, the invention is illustrated with reference to examples which, however, are not intended to restrict it.

EXAMPLES

Example 1

A 50 μm thick blown film composed of 84.7 parts by weight of polyethylene (PE-VLD, copolymer of ethylene and octene, density=0.890 g/cm$^3$, melt flow rate at 190° C./2.16 kg (ISO 1133)=1 g/10 min), 5 parts by weight of titanium dioxide, 10 parts by weight of chalk and 0.3 part by weight of light stabilizer Tinuvin 770 (Ciba-Geigy) and having a Young's modulus of 40 N/mm$^2$ was laminated to a nylon 6/6.6 warp knit fabric having a basis weight of 43 g/m$^2$ and a mesh count of 10 meshes/cm in machine direction and 14 mesh rows/cm in the cross direction, using a 2-part PU-based laminating adhesive.

A solution of a polyisobutylene blend composed of Oppanol B 10, Oppanol B 80 and Oppanol B 150 (BASF) in a ratio of 10:60:30 in petroleum spirit of the boiling fraction 60/95 was applied to the corona-treated reverse of the laminate such that drying thereof gave an adhesive film with a thickness of 25 μm.

Example 2

The protective article is the same as in example 1 but using a 70 μm thick three-layer blown film composed of two outer layers each 10 μm thick and composed of 84.7 parts by weight of polyethylene (PE-VLD, copolymer of ethylene and octene, density=0.902 g/cm$^3$, melt flow rate at 190° C./2.16 kg (ISO 1133)=1 g/10 min), 5 parts by weight of titanium dioxide, 10 parts by weight of chalk and 0.3 part by weight of light stabilizer Tinuvin 770 (Ciba-Geigy) and a 50 μm thick inner layer composed of 99.7 parts by weight of polypropylene copolymer (terpolymer of propylene and two other olefins, density=0.890 g/cm$^3$ and melt flow rate at 230° C./2.16 kg (ISO 1133)=0.6 g/10 min) and 0.3 part by weight of light stabilizer Tinuvin 770, having a Young's modulus of 95 N/mm$^2$.

Example 3

Prior to the application of the self-adhesive composition, which is the same as in example 1, a film/knit laminate as described in example 1 was needled using a needle roll having 15 conical needles/cm$^2$. The diameter of the perforations was set at 0.5 mm by means of the depth of penetration of the needles.

Example 4

A protective article as in example 1, but using a nylon 6/6.6 warp knit fabric having a mesh count of 14 meshes/cm in the machine direction and 14 mesh rows/cm in the cross direction and a basis weight of 60 g/m$^2$.

Comparative Example 1

The protective article is as in example 1 but using instead a film of high-density polyethylene (PE-HD, density=0.963 g/cm$^3$, melt flow rate at 190° C./2.16 kg (ISO 1133)=0.2 g/10 min) with a thickness of 50 μm and a Young's modulus of 850 N/mm$^2$.

Comparative Example 2

The protective article is as in example 1 but without lamination of knitted fabric to the basefilm.

Comparative Example 3

A woven cotton fabric (linear fiber density 200 dtex, thread count warp 30 1/cm, thread count weft 28 1/cm) is coated with the solution of a self-adhesive composition analogous to that described in example 1 in such a way that the adhesive add-on to the fabric after drying was 50 g/m$^2$.

Test Criteria

Four particularly relevant performance criteria for a protective article for plastic motor vehicle mounted parts were used in order to compare the specimens of the examples:

1. Irreversible paint deformation under the bonded area
2. Creasing of the bond
3. Resistance to penetrative chafing
4. Protection of the plastic part against chemicals, using battery acid as example Selected as the test substrate were VW Golf IV bumpers with their original paint finish, with specimens of the self-adhesive protective articles 30 cm in length and 15 cm in height bonded to their corner parts, which were characterized by particularly strong three-dimensional curvature.

Test Procedure

1. Paint Deformation

The test material was stuck to the bumper, which was stored in a thermal chamber at 90° C. for three days. After cooling, the test specimen was removed and the surface of the bumper was inspected for irreversible changes in the surface quality of the finish.

The following points system reflects the degree of paint deterioration:

0=not visible
1=barely visible
2=slightly visible
3=distinctly visible

2. Creasing of the Bond

In the course of bonding an attempt was made to position the test specimen with as little creasing as possible on the curved corner of the bumper.

The extent of creasing was assessed using the following scheme:

0=no creases
1=isolated creases
2=several creases
3=numerous creases

The creasing is a measure of the expected deterioration of the paint under the cavities, as a result of possible water inclusion in the presence of moisture, and visible impressions as a result of contact angle effects.

3. Resistance to Penetrative Chafing

The test specimen was adhesively bonded to a metal plate and was subjected in an abrasion tester to a circular test mandrel under a load of 3 kg, applied at a frequency of 1 Hz, until the mandrel came into contact with the metal plate.

Assessment scheme:

0=more than 400 strokes
1=250 to 400 strokes
2=100 to 200 strokes
3=less than 100 strokes 4 Chemical Resistance A test specimen bonded to the test bumper had 1 ml of battery acid trickled over it using a pipette, and the bumper was immediately stored at 80° C. for 30 minutes. The test specimen was then removed and the underlying paint was examined for deterioration.

The evaluation scheme for the extent of deterioration is as follows

0=not visible
1=barely visible
2=slightly visible
3=distinctly visible

Overview of the Results

A low overall score (column Σ) denotes a good overall performance outcome.

|  | Paint deformation over area | Creasing on 3D surface | Resistance to penetrative chafing | Chemical resistance | Σ |
|---|---|---|---|---|---|
| Ex. 1 | 0 | 0 | 0 | 0 | 0 |
| Ex. 2 | 0 | 0 | 0 | 0 | 0 |
| Ex. 3 | 0 | 0 | 0 | 1 | 1 |
| Ex. 4 | 0 | 0 | 0 | 0 | 0 |
| Comp. ex. 1 | 0 | 3 | 0 | 0 | 3 |
| Comp. ex. 2 | 0 | 0 | 3 | 0 | 3 |
| Comp. ex. 3 | 3 | 2 | 1 | 3 | 9 |

The evaluation clearly shows that excellent results in the critical performance tests are achieved with the product structure according to the invention.

In contrast to the comparative examples, the inventive examples are paint-compatible, conforming, extremely abrasion-resistant protective articles which are impervious to liquids and for all these reasons are highly suitable for the reliable protection and retention of value in painted plastic mounted parts for automobiles.

What is claimed is:

1. A method for the mechanical protection of curved areas on the outside of automobiles which comprises applying to said curved areas a protective sheet comprised of a backing material in film form having a Young's modulus of less than 300 N/mm$^2$, an outer side and an inner side, the outer side of which is laminated with a layer of knitted fabric and the inner side of which is pressure-sensitively adhesive through application of a self-adhesive composition.

2. A method for the mechanical protection of painted plastic automobile bumpers, which comprises applying to said bumpers a protective sheet comprised of a backing material in film form having a Young's modulus of less than 300 N/mm$^2$, an outer side and an inner side, the outer side of which is laminated with a layer of knitted fabric and the inner side of which is pressure-sensitively adhesive through application of a self-adhesive composition.

3. The method of claim 1 or 2, wherein the backing material in film form has a thickness of from 10 to 150 µm.

4. The method of claim 1 or 2, wherein the backing material in film form is composed of polyolefins, polyolefin blends, polyurethane, flexible PVC or a combination thereof.

5. The method of claim 1 or 2, wherein the backing material in film form contains more than 0.15% by weight of a light stabilizer.

6. The method of claim 1 or 2, wherein the backing material in film form is perforated, foamed or both.

7. The method of claim 1 or 2, wherein the knitted fabric has a basis weight of from 10 to 200 g/m$^2$.

8. The method of claim 1 or 2, wherein the knitted fabric is composed of polyamide, polyester or polyethylene.

9. The method of claim 1 or 2, wherein the backing material is coated with from 10 to 80 g/m$^2$, of a self-adhesive composition.

10. The method of claim 1 or 2, wherein the backing material in film form is joined to the knitted fabric by means of a laminating adhesive.

11. The method of claim 10, wherein the backing material in film form is joined to the knitted fabric by means of a reactive laminating adhesive based on a two-part polyurethane.

12. The method of claim 10, wherein the laminating adhesive is applied over the complete area or partially.

13. The method of claim 1 or 2, wherein the base polymer of the pressure sensitive adhesive is polyisobutylene or polyethylene-vinyl acetate.

14. The method of claim 1 or 2, wherein an adhesion promoter is situated between the backing material in film form and pressure sensitive adhesive.

15. The method of claim 1 or 2, wherein said Young's modules is less than 150 N/mm$^2$.

16. The method of claim 3, wherein said thickness is from 40–100 µm.

17. The method of claim 5, wherein the backing material in film form contains more than 0.3% by weight of said light stabilizer.

18. The method of claim 7, wherein said basis weight is from 20–80 g/m$^2$.

19. The method of claim 9, wherein said backing material is coated with from 15–40 g/m$^2$ of said self-adhesive composition.

* * * * *